Aug. 21, 1951    C. SHULER ET AL    2,565,273
BATTERY CHARGER

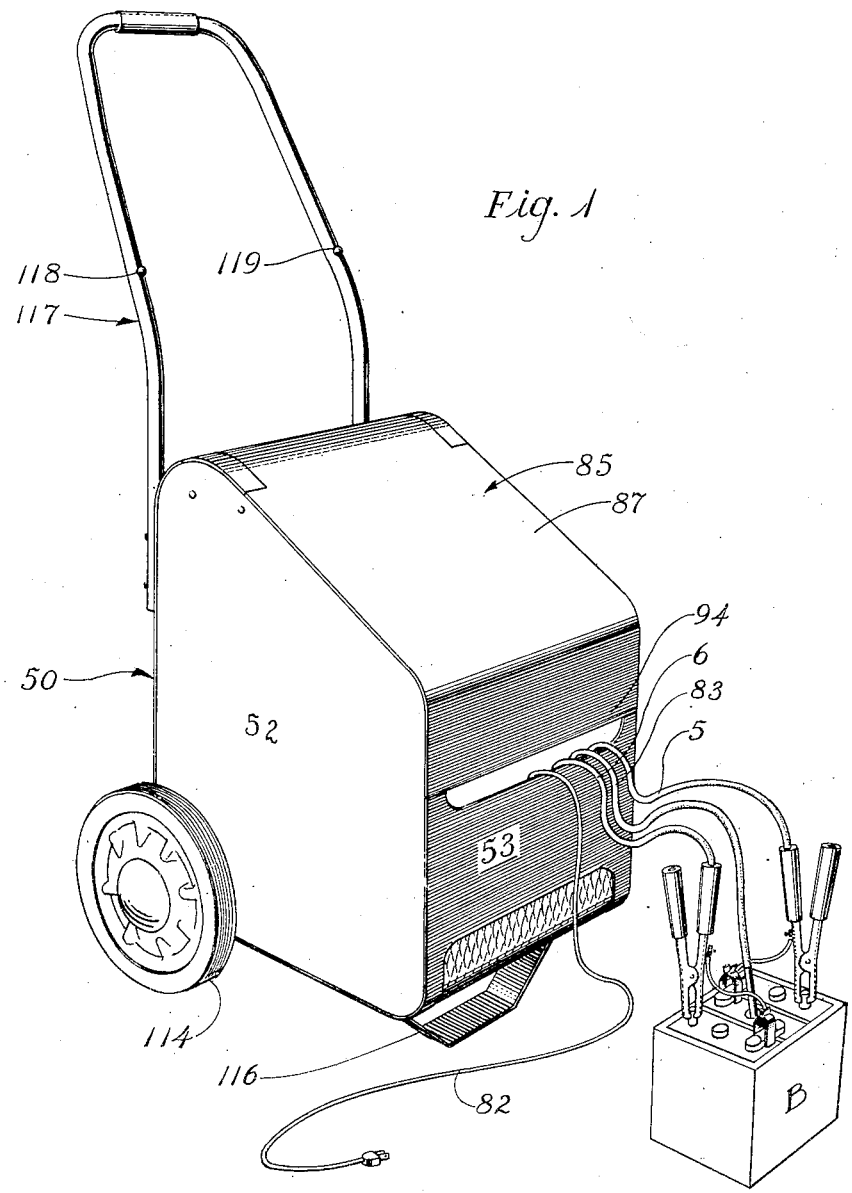

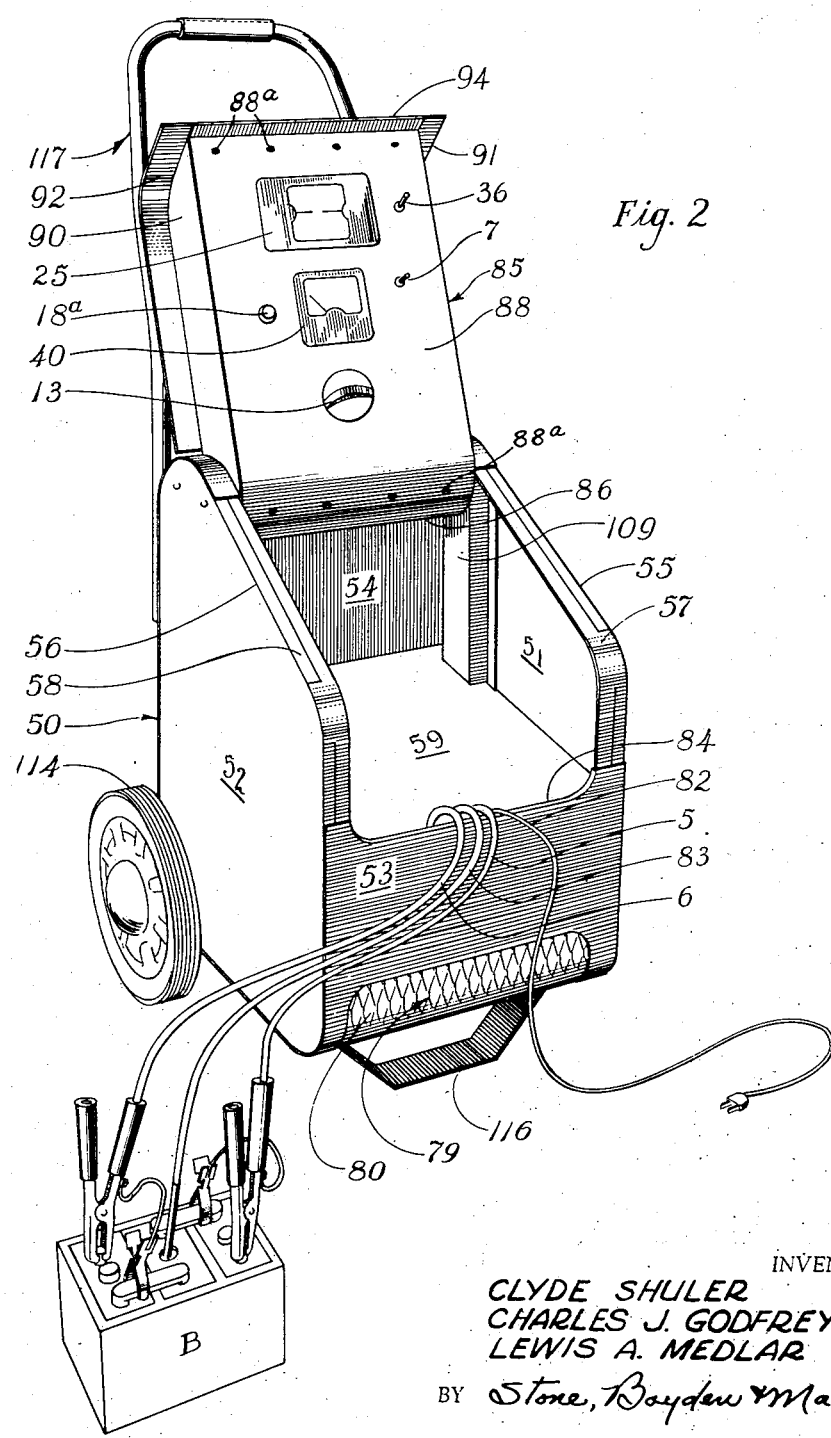

Filed Sept. 11, 1950    6 Sheets-Sheet 3

INVENTOR
CLYDE SHULER
CHARLES J. GODFREY
LEWIS A. MEDLAR
BY Stone, Boyden & Mack
ATTORNEYS INVENTOR
CLYDE SHULER
CHARLES J. GODFREY
LEWIS A. MEDLAR
BY Stone, Boyden & Mack
ATTORNEYS Aug. 21, 1951  C. SHULER ET AL  2,565,273
BATTERY CHARGER Filed Sept. 11, 1950  6 Sheets-Sheet 5

INVENTOR
CLYDE SHULER
CHARLES J. GODFREY
LEWIS A. MEDLAR
BY Stone, Boyden & Mack
ATTORNEYS

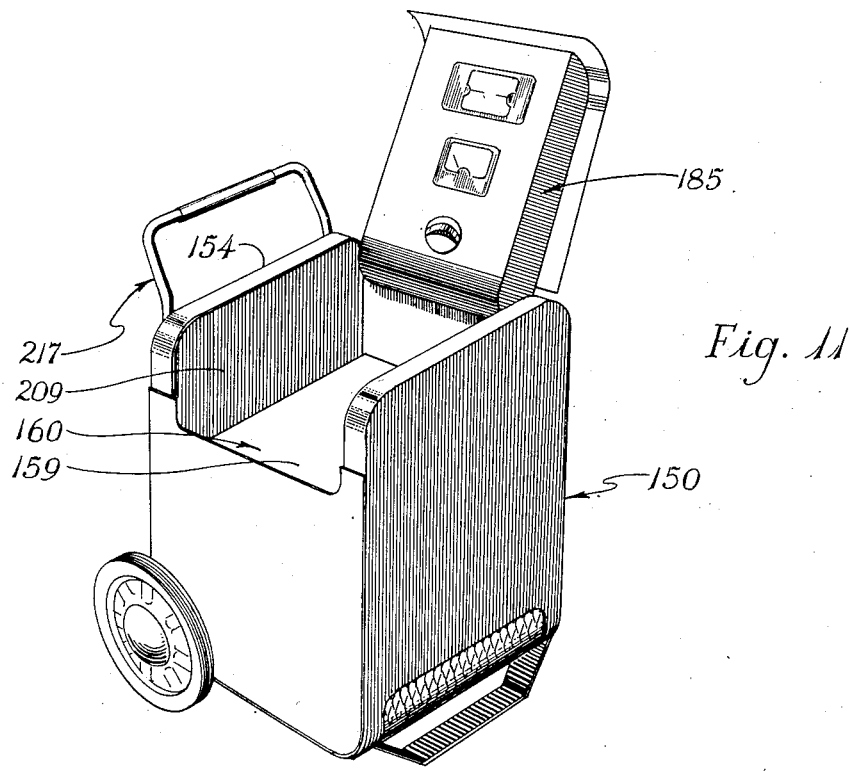

Patented Aug. 21, 1951

2,565,273

UNITED STATES PATENT OFFICE 2,565,273

BATTERY CHARGER

Clyde Shuler, Media, Charles J. Godfrey, Philadelphia, and Lewis A. Medlar, Oreland, Pa., assignors, by mesne assignments, to Sterlingworth Company, Philadelphia, Pa., a corporation of Delaware Application September 11, 1950, Serial No. 184,248

13 Claims. (Cl. 320—2)

This invention relates to battery chargers and particularly to fast chargers of the portable type used in garages and service stations to charge automotive batteries without removing the battery from the vehicle.

In such chargers, there is usually provided a charging circuit including essentially a transformer, an insulated cable for supplying commercial alternating current to the transformer, a rectifier connected to the secondary of the transformer, and a pair of insulated charging leads or cables, each provided with a large clamp-type connector for engaging the battery terminals, for supplying direct current from the rectifier to the battery to be charged. The insulated leads or cables are necessarily long, and their storage when the charger is not in use has always presented a problem. It has, for example, been common practice to provide the charger with hooks on the outside of the charger casing, the cables being coiled and hung on these hooks when not in use. Also, it has been proposed to provide such chargers with complicated, relatively expensive cable wind-up reels.

Such chargers, in addition to the charging circuit just mentioned, always employ subsidiary circuits connected to the charging circuit, usually including a control circuit having at least one manually adjustable control element, i. e., a tap switch, a fast-slow switch, or the like, and a testing circuit including a visible meter or indicator. The manually operated switches of the control circuit and the meter of the testing circuit are ordinarily mounted on the top of the charger casing, so they can be viewed and manipulated from above. This practice has two primary disadvantages. First, the instrument panel, constituting the outside top surface of the charger, is left exposed to the weather and to danger of mechanical impact during operation of the charger, usually involving periods of from one half hour to an hour for each charging operation. Second, the instrument panel, being the top of the charger casing, is substantially horizontal and at a rather low level above the ground, requiring the operator to bend over or stoop down when adjusting the control element or elements.

The object of the present invention is to provide a battery charger of the type described wherein the construction of the charger casing and the disposition of the various components of the charging and subsidiary circuits in the casing combine to overcome all of the foregoing disadvantages.

In order that the invention may be readily understood, reference is had to the accompanying drawings, which form a part of this specification, and wherein:

Fig. 1 is a perspective view of a preferred form of battery charger embodying the present invention, showing the charger connected to a battery and having the cover of the casing in closed position;

Fig. 2 is a perspective view similar to Fig. 1, but showing the cover in raised position;

Fig. 11 is a perspective view of a battery charger somewhat differently arranged than that shown in Figs. 1–3, but yet embodying the novel features of the present invention.

Figure 5:
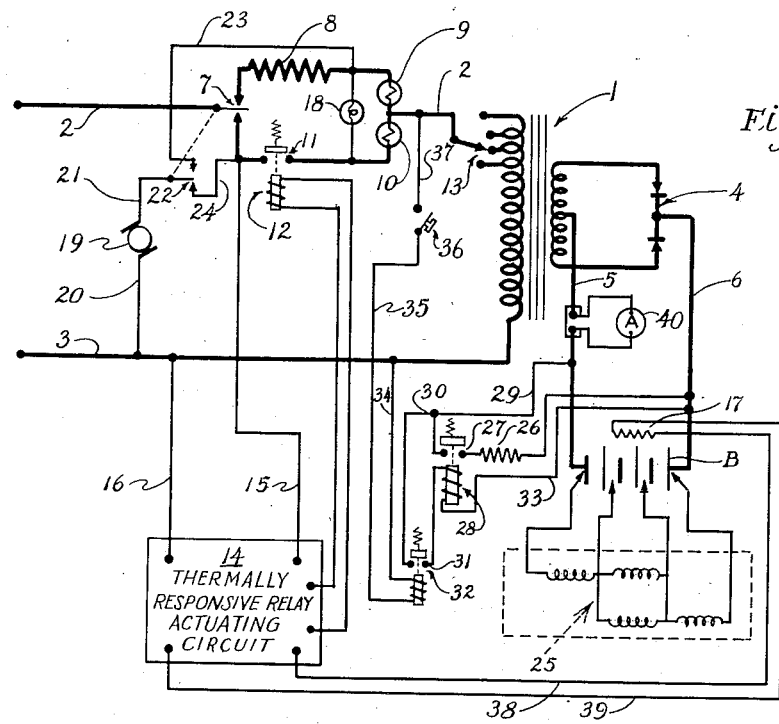
Fig. 5 is a schematic circuit diagram of the charger shown in Figs. 1–3.

Referring now to the drawings, the circuit diagram of Fig. 5 will be first discussed in order that the general nature of the charger to which the invention applies may be understood. It will be seen that the circuit shown in Fig. 5 includes a transformer 1, the primary of which is supplied by conductors 2 and 3. The secondary of the transformer supplies a dry-plate rectifier 4, and direct current from the rectifier is carried to the battery B by conductors 5 and 6.

Interposed in conductor 2 is a manually controlled "fast-slow" control circuit, of the type described and claimed in Patent 2,456,978 to L. A. Medlar and application Serial Number 125,324, filed November 3, 1949, by L. A. Medlar. Said circuit comprises a two-position switch 7, operation of which selectively closes either the branch circuit comprising slow-charge resistor 8 and circuit breaker 9, or the branch circuit comprising circuit breaker 10 and the normally open contacts 11 of a relay 12, this latter branch being the one selected for fast charging. Conductor 2 is connected to the primary of the transformer 1 by the usual manual tap switch 13. Relay 12 has its energizing winding connected to a relay actuating circuit illustrated diagrammatically at 14, said actuating circuit being supplied with current by conductors 15 and 16 and being so designed as to cause the contacts 11 of relay 12 to be closed only when a thermally responsive resistor 17, inserted in the battery to be charged, is below a predetermined temperature. Such relay actuating circuits, used both as safety devices to prevent overheating of the battery and as the sole means for terminating charging, are shown and claimed in application Serial Number 87,494, filed April 14, 1949, by J. B. Godshalk and L. A. Medlar, now Patent No. 2,529,038, granted November 7, 1950, application Serial Number 124,612, filed October 31, 1949, by J. B. Godshalk, now Patent No. 2,550,344, granted April 21, 1951, and Patent 2,499,663 to L. A. Medlar.

A pilot light 18 is connected across the series combination of both circuit breakers 9 and 10 to operate as a "trouble light." A cooling fan motor 19 is connected across the charger supply circuit by conductors 20 and 21, a two-position switch 22 coupled to switch 7 for simultaneous operation therewith, and either conductor 23 or 24, as shown.

If the switch 7 is thrown to "fast-charge" position, and the thermally responsive resistance 17 is inserted in the battery and the battery is at a low temperature safe for charging, current will then be supplied to the battery B at a high rate, dependent upon the setting of top switch 13, until the temperature of the battery increases, as a result of charging, to a predetermined value. When this temperature value is reached, being sensed by resistance 17, relay 12 will be opened by action of actuating circuit 14, and charging will be terminated. If the switch 7 is thrown to its upper position, current is supplied to the battery at a lower rate, determined by the value of resistance 8 and the setting of tap switch 13. The motor 19 operates to drive a fan for cooling the transformer 1 and rectifier 4, as will be hereinafter shown.

Connected to the battery B is an automatic battery cell comparator 25, designed to compare the voltages of the individual cells of the battery when the battery is discharging through a resistance 26. The cell comparator is described and claimed in application Serial Number 40,054, filed July 22, 1948, by J. B. Godshalk and L. A. Medlar. It will be seen that the discharge resistor 26 is connected across the battery, by charging leads 5 and 6, only when the contacts 27 of a normally open relay 28 are closed. The actuating winding of relay 28 is connected across the charging leads 5 and 6, so as to receive current from the battery, by a circuit comprising conductors 29 and 30, the normally open contacts 31 of a relay 32, and conductor 33. The actuating winding of relay 32 is connected across charger supply leads 2 and 3 by conductors 34 and 35, manual switch 36 and conductor 37. Thus, when the manual switch 36 is closed, relay 32 is actuated to energize relay 28, and discharge resistor 26 is connected across the battery to discharge the same so that a test reading of the cell comparator 25 may be taken.

It will be understood that, in actual practice, the leads 2 and 3 are combined in a single insulated cable for connecting the primary of transformer 1 to a source of commercial alternating current. Similarly, charging leads 5 and 6 must be single insulated cables capable of being connected to the battery, which is normally at a distance of three or four feet from the charger proper, when the charger is in use. The resistance 17 must be inserted in the battery, and must therefore be connected to relay actuating circuit 14 by an insulated cable comprising conductors 38 and 39.

It will further be noted that comparator 25 constitutes a measuring device which must be viewed by the operator. Also, a conventional ammeter 40 in one of the charging leads is usually required, and this too must be visible. And the manually operated switches 7, 13 and 36 must be readily available for manipulation by the operator.

Referring to Figs. 1–3 and 6, the invention will now be described as applied to the known battery charger just discussed. With specific reference to Fig. 2, it will be seen that the invention includes a casing 50 having side walls 51 and 52, a front wall 53, and a back wall 54. Side walls 51 and 52 have forwardly slanting top edges 55 and 56, respectively, each top edge comprising an inturned flange as indicated at 57 and 58. The interior of casing 50 is divided by a transverse, horizontal panel or partition 59 into an upper compartment 60 and a lower compartment 61, as is more clearly shown in Fig. 3. The partition 59 is supported by angle members 62 secured to the side walls and back wall of the casing, and is provided at its forward extremity with a rolled edge 63 spaced rearwardly from the front wall 53.

Figure 4:
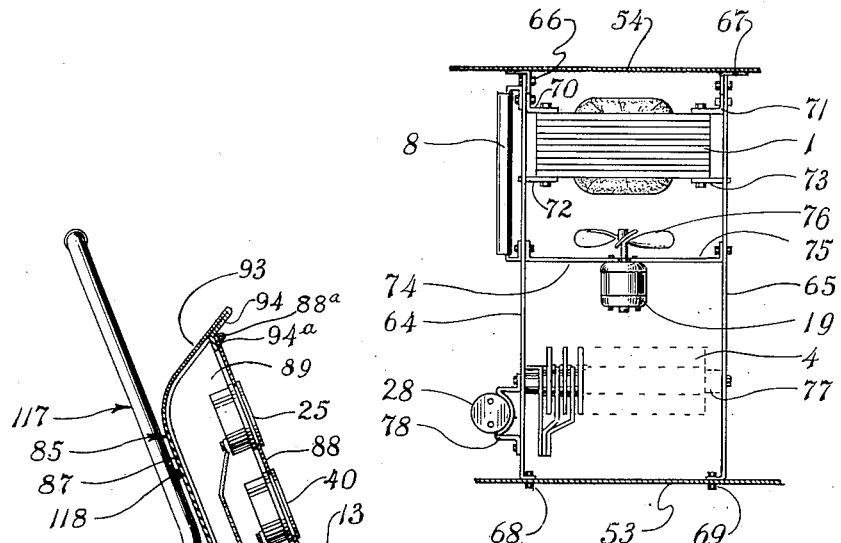
Fig. 4 is a plan view of a preferred transformer and rectifier assembly employed in the charger shown in Figs. 1–3.

Mounted in the lower compartment 61 of the casing 50 is the transformer-rectifier assembly shown in Fig. 4. This assembly preferably comprises a pair of spaced stringers 64 and 65 secured at one end to back wall 54 of the casing, as by brackets 66 and 67, and at their opposite ends to front wall 53, as by bolts at 68 and 69. The transformer 1 is mounted between stringers 64 and 65, as by brackets 70 and 71 and hooked arms 72 and 73. The fan motor 19 is similarly supported between the stringers by brackets 74 and 75, and carries on its shaft a conventional fan 76. Slow charge resistor 8 is mounted parallel with stringer 64 as shown. The dry plate rectifier 4 is preferably of the type comprising a plurality of plates spaced along a shaft, as the round shaft 77, and in this event can be mounted between the stringers by providing the shaft 77 with threaded ends of reduced diameter, the threaded ends extending through holes in the stringers and receiving nuts to lock the rectifier in place, as shown. Test relay 28 is preferably also mounted on stringer 64, as by a suitable bracket 78. The discharge resistor 26 is mounted beneath the rectifier 4, as seen in Fig. 3, by suitable brackets depending from the stringers 64 and 65.

Figure 3:
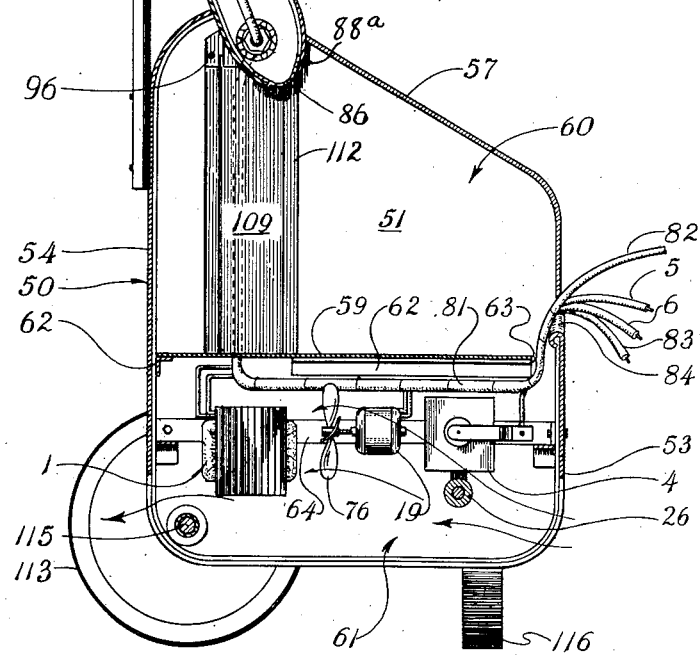
Fig. 3 is a vertical sectional view taken longitudinally through the device of Fig. 2, parts being shown in elevation, and the battery and portions of the insulated leads being omitted.

The front, bottom and back panels of the casing 50 are preferably formed from a single sheet of metal, this sheet being provided with a major opening extending over substantially the entire bottom of the casing, as well as a portion 79 of the front wall 53, as seen in Figs. 1-3, and a similar portion of the back wall 54, as shown in Fig. 3. Over this entire opening is provided a sheet of perforated material 80, preferably of expanded metal. The fan 76 is arranged to pass air inwardly through the front portion 79 of this opening, across the transformer-rectifier assembly, and out through the portion of the opening at the lower part of back wall 54, as indicated by the arrows in Fig. 3. It will thus be seen that the main components of the charging circuit are mounted in the lower compartment 61 of casing 50, including all of the elements which require cooling during operation of the charger.

While no connections for the electrical components of the charging circuit are shown in Fig. 4, it will be seen from Fig. 3 that the leads from the transformer 1, the rectifier 4, the fan motor 19, relay 28 and slow-charge resistor 8 join a conductor bundle illustrated at 81 and extending below partition 59. The conductors of conductor bundle 81 extend on the one hand into the several insulated cables required to connect the charger to the battery and to a source of alternating current, and on the other hand to the electrical components of the control and test circuits, as hereinafter described. Thus, at the front of the casing, the conductor bundle resolves into insulated charging leads or cables 5 and 6, an insulated cable 82 containing the supply conductors 2 and 3, Fig. 5, and an insulated cable 83 containing conductors 38 and 39, Fig. 5. From the lower compartment 61, the cables 5, 6, 82 and 83 extend upwardly to compartment 60, through the space between rolled edge 53 of partition 59 and front wall 53 of the casing.

As seen in Figs. 1 and 2, the front wall 53 of casing 50 has its upper edge downwardly notched or cut away over a major part of its length, and this notched portion is provided with an inwardly rolled edge, as indicated at 84. Thus, when the charger is to be used, the insulated cables 5, 6, 82 and 83 may extend from the upper cable storage compartment 60 across the downwardly offset rolled edge 84, to be connected to the battery B as shown in Figs. 1 and 2.

A hollow cover 85 of substantial thickness is provided to close the top of casing 50 and thus the top of compartment 60. The cover 85 is hinged, as will be hereinafter described, to the casing 50 adjacent the back wall thereof. As seen in Fig. 3, the cover, which is fabricated from sheet metal, comprises a top wall 87 which is bent to form the front wall 93 as shown, the front wall 93 including a flange 94 bent back upon itself and terminating in a second flange 94ª parallel to the top wall 87. Secured to the flange 94ª and generally parallel to the top wall 87 is the lower wall 88, which forms the instrument panel of the charger. At the back of the cover, the top and bottom walls 87 and 88 are joined by a curved member 86. Spaced parallel side walls 89 and 90 are each welded to the top wall 87 and are provided with suitable inturned flanges to which the instrument panel 88 is secured by screws. The member 86 is preferably welded to the top wall 87, while the connections between the panel 88 and the members 86 and flange 94ª are preferably made by screws, as indicated at 88ª, Figs. 2 and 3. The side walls 89 and 90 are so spaced that the cover proper is capable of passing between the inturned flanges 57 and 58 of the casing side walls. The top wall 87 of the cover is extended beyond the cover side walls 89 and 90 to provide flanges 91 and 92 arranged to overlie the flanges 57 and 58, respectively, when the cover is in closed position. As shown in Fig. 1, the flange 94 is so arranged as to be substantially contiguous to the upper edge of the front wall of casing 50 when the cover is closed. Therefore, when the cover is closed, the flange 94 and the notched edge 84 of the front wall 53 of the casing define a slot-like opening communicating with the compartment 60 and through which the cables 5, 6, 82 and 83 may pass. That is, the notch in the upper edge of the wall 53 provides an opening which interrupts the contiguity of the meeting edges of the wall 53 and the flange 94 when the cover is in closed position, thus allowing the cables to lie extended from the cable storage compartment 60 even though the cover is closed.

Figure 6:
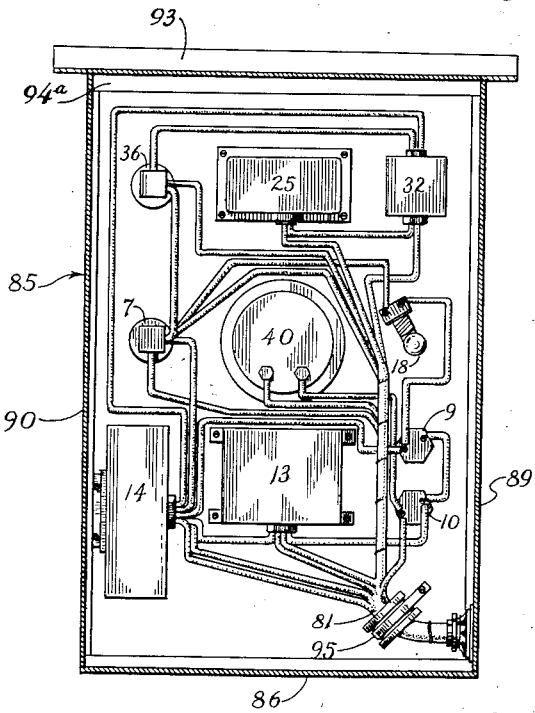
Fig. 6 is a sectional view of the cover of the charger shown in Figs. 1–3, electrical components mounted in the casing being shown in plan, and the section being taken through the cover parallel to the main plane thereof, viewed from back to front.

As shown in Fig. 2, the lower or inner surface 88 of the cover 85 is completely exposed when the cover is in raised position, and this lower surface constitutes the instrument panel of the charger, carrying all of the manually operated electrical components of the control and test circuits of the charger, as well as the meters. As seen in Figs. 3 and 6, the manual selector switch 7, the test switch 36 and the tap switch 13 are mounted within the hollow cover 85, with the manual operating members exposed on the lower surface 88 thereof, so that these switches can be manipulated easily by the operator when the charger cover is in raised position. Similarly, the cell comparator 25 and the ammeter 40 are mounted within the hollow cover, with their indicating faces exposed on the lower surface of the cover, and the pilot light 18 is mounted behind the lower wall 88 of the cover so as to be visible through a suitable colored glass disc 18ª. The remaining electrical components of the control and test circuits, namely, the relay actuating circuit 14 including its relay 12, the circuit breakers 9 and 10, and the test relay 32, are also mounted within the cover 85 as illustrated in Fig. 6, but of course have no manually operated elements or visible portions appearing on the lower surface of the cover. The conductors connecting the electrical components in cover 85 to their respective connections in the charging circuit are grouped together in conductor bundle 81 which, as previously stated, extends from lower compartment 61. The conductor bundle 81 is positioned by a suitable bracket 95 and from this bracket extends through one of the hinges of the cover, as will now be described.

Figure 8:
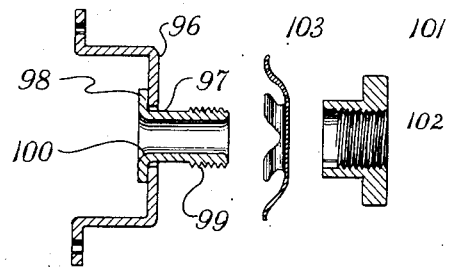
Fig. 8 is a view showing the manner of assembling parts of the hinge shown in Fig. 7.
Figure 9:
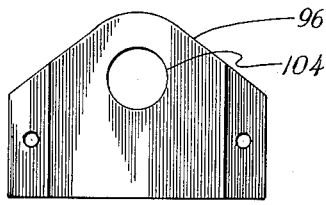
Fig. 9 is a plan view of a bracket employed to secure the hinge to the casing side wall.
Figure 7:
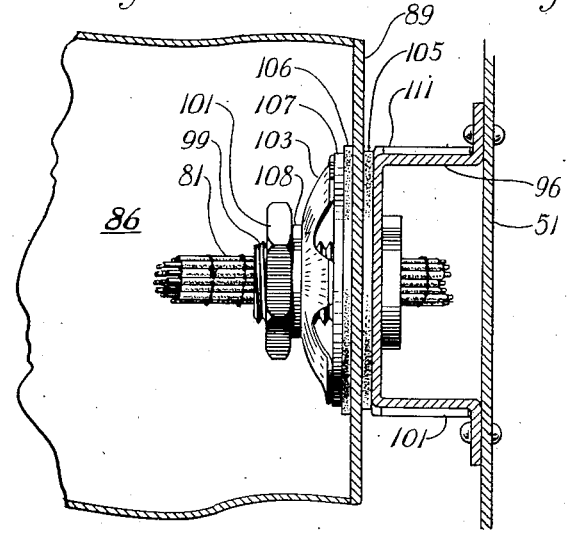
Fig. 7 is a detail view of a preferred friction hinge employed to mount the cover of the charger shown in Figs. 1–3, portions of the cover and casing side walls being shown in section.
Figure 10:
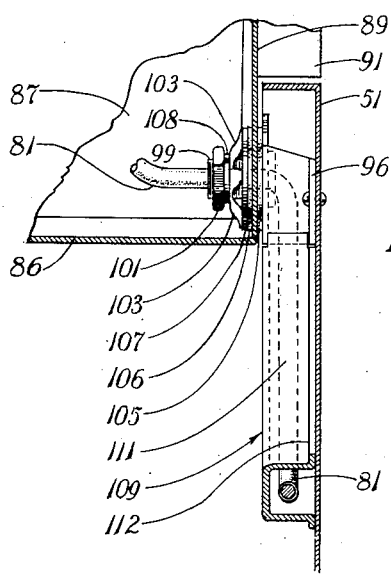
Fig. 10 is a detail view similar to Fig. 7, but in elevation, showing the manner in which electrical conductors connected to the components mounted in the charger cover extend through the hinge shown in Figs. 7 and 8.

Each hinge of the cover 85 is located in one of the side walls 89 and 90 adjacent the bend 86, and is carried by a bracket 96, Fig. 9, secured to the corresponding side wall of the casing 50. As shown in Fig. 8, each hinge comprises a central sleeve 97 constituting a hollow hinge pin and having a flange 98 and an exteriorly threaded end portion 99. The central bore 100 of the sleeve 97 is rounded at each end, so that the conductor bundle 81 can be passed therethrough without damage. Cooperating with the sleeve 97 is a nut 101 having an interiorly threaded portion 102 matching the threads at 99 on the sleeve 97. To be clamped between the sleeve 97 and its cooperating nut 101 is a dished resilient washer or spider 103. The completed hinge assembly is shown in Figs. 7 and 10. The flange 98 of the sleeve 97 engages the bracket 96, while the body of the sleeve extends through a hole 104 in the bracket, and thence through a leather friction washer 105, the side wall 89 of the cover 85, a second leather friction washer 106, a brass bearing washer 107, the resilient washer 103, and a second brass bearing washer 108. The entire hinge assembly is clamped together by threading nut 101 onto the threaded portion 99 of the sleeve 97 until the dished resilient washer 103 and the leather washers 105 and 106 are compressed. When the cover 85 is moved, all of the aforementioned washers rotate with the swinging movement of the cover, but the leather washers 105 and 106 provide sufficient friction to hold the cover 85 in any desired position. Only the hinge at the right hand rear corner of the cover has been shown in Figs. 7 and 10, but it will be understood that the cover 85 is similarly hinged at the opposite corner.

As shown in Figs. 7 and 10, the conductor bundle 81 extends through the bore 100 of the sleeve 97 of the right hand cover hinge, that is, the hinge adjacent side wall 51 of casing 50. Cooperating with the bracket 96 of this hinge is a conduit 109 arranged to carry the conductor bundle through the cable storage compartment 60 to the lower compartment 61. The conduit 109 is formed with a U-shaped cross-section so as to have side walls 110 and 111, Figs. 7 and 10, provided with flanges, as at 112, Fig. 10, secured to the casing side wall 51. Side walls 110 and 111 of the conduit 109 are extended upwardly, as seen in Figs. 7 and 10, to embrace the bracket 96 of the cover hinge. Panel 59 is provided with a suitable opening, not shown, registering with the conduit 109. Thus, the conductor bundle 81 is led through the cover hinge as described, and from the hinge to the lower compartment 61 of the casing is continually protected by the conduit 109 and thereby isolated from the lead storage compartment 60.

The charger casing 50 is provided with a pair of wheels 113 and 114 carried by an axle 115 journalled in the side walls of the casing toward the rear thereof. A ground prop 116 is provided at the front of the casing as shown. A tubular handle 117 is secured to the back wall 54 of the charger casing, its main portion being bent at an angle rearwardly as shown. A pair of rubber bumpers 118 and 119 are secured to the handle and, as seen in Fig. 3, serve to support the cover 85 when the cover is fully raised to expose the lower surface 88 thereof.

From an inspection of Figs. 1–3, it will be seen that the construction of the casing 50 and the cover 85, and the disposition of the electrical components of the circuits of the charger, combine to provide a practical solution to the several problems of cable storage and charger handling and manipulation that have heretofore always been encountered in battery chargers of the type described. Division of the casing by partition 59 into the two separate compartments 60 and 61 has several important results. First, the upper compartment 60 forms a cable storage space into which the cables 5, 6, 82 and 83 are placed, completely protected and out of the way, when the charger is not in use. Second, this division of the casing places the relatively heavy charging circuit components, including transformer 1 and rectifier 4, low in the charger, so that the center of gravity is kept down. Third, the lead storage compartment 60, being separated from the compartment 61 by the substantially continuous partition 59, is protected from the heat generated in the charging components, since the fan 76 continually passes air across the lower surface of the partition as the charger operates. Further, the lead storage compartment 60 forms an insulating air space between the hot charging circuit components and the relatively delicate relays and meters in the hinged cover 85.

Provision of the hollow hinged cover 85 serves to allow ready access to the cable storage compartment 60 and to provide mounting space for the control and test circuit components at a point removed from the high temperature area of the casing. Since those components of the control and test circuits which must be either viewed or manipulated by the operator are exposed on the lower surface of the cover 85, it is necessary to swing the cover to raised position during adjustment of the charger and during testing, thus raising the instruments to a convenient level above the ground and eliminating the necessity for the operator to stoop over the charger when making adjustments or tests. Further, construction of the hinged cover 85 and the casing 50 in the manner described, and distribution of the electrical components of the charger therein in accordance with the invention, allows the cover to be closed during the charging operation. When the cover is closed, nothing is exposed except the continuous metal sheets of the casing and, of course, the cables extending to the battery being charged.

Though the invention has been illustrated as including a cover hinged at the rear of the casing, it will be obvious that the invention is not limited to this arrangement. Fig. 11 shows a different arrangement of a charger of the same general type as has been described with reference to Figs. 1–3. Here, the cable storage compartment 160 opens toward one side of the casing 150, the cover being hinged to the casing at the opposite side.

It will also be obvious that the conduit means employed to carry the conductors of the control and test circuits through the cable storage compartment need not be constructed precisely as shown in Figs. 2 and 3. For example, in the embodiment shown in Fig. 11, the conduit means comprises the rear wall 154 of the casing 150 and an inner wall 209 extending upwardly from the partition 159 to the top of rear wall 154 along the full width of the rear wall, but spaced inwardly therefrom to accommodate the conductors.

What we claim is:

1. In a battery charger of the type including a charging circuit, comprising a transformer, a rectifier supplied by said transformer, a control circuit having a manually operated switch, and a testing circuit including a visible indicator, the combination with a casing in which said transformer and rectifier are housed, said casing having upright walls, of a cover for said casing hinged at one edge thereto, means mounting electrical components of said control and test circuits, including said switch and indicator, on said cover, with the manual operating element of said switch and the face of said indicator disposed on the inner surface of said cover so as to be exposed when said cover is in open position, conductors connecting said manual switch with said charging circuit, and conductors adapted to connect said indicator with the battery to be charged.

2. A battery charger in accordance with claim 1, in which the cover is provided with a hollow hinge pin, and in which said conductors pass axially through said hollow pin.

3. In a battery charger of the type including a charging circuit comprising a transformer, an insulated cable for supplying alternating current to said transformer, a rectifier supplied by said transformer, and a pair of insulated charging cables for supplying direct current from said rectifier to the battery to be charged, the combination with a casing having one compartment in which said transformer and rectifier are housed, and another separate compartment in which said cables may be stored, said last mentioned compartment having upright walls, of a cover for said last mentioned compartment hinged at one edge to said casing adjacent one of said walls and movable toward the opposite wall to a closed position, and a flange on said cover at the edge of the cover opposite the hinge, said flange being positioned to abut the upper edge of said opposite wall when said cover is in closed position, the contiguity of the meeting edges of said flange and said opposite wall being interrupted, when said cover is in closed position, by an opening through which said insulated cables may extend from said compartment during a charging operation.

4. In a battery charger of the type including a charging circuit comprising a transformer, an insulated cable for supplying alternating current to said transformer, a rectifier supplied by said transformer, and a pair of insulated charging cables for supplying direct current from said rectifier to the battery to be charged, the combination with a casing in which said transformer and rectifier are housed, said casing having a compartment in which said cables may be stored, said compartment having upright walls, of a cover hinged at one edge to said casing at a point adjacent one of said walls, and movable toward the opposite wall to closed position, and means providing an opening between said cover, when closed, and the upper edge of said opposite wall, through which opening said cables may extend for charging a battery.

5. In a fast charger of the type comprising a charging circuit including a transformer, an insulated lead for supplying alternating current to said transformer, a rectifier supplied by said transformer, and a pair of insulated charging leads connected to said rectifier for supplying direct current to the battery to be charged, said charger also including subsidiary control and test circuits connected to said charging circuit, the combination of a casing having upright side walls, a transverse partition dividing said casing into an upper lead storage compartment and a lower compartment, means mounting the transformer and rectifier of said charging circuit within said lower compartment with said leads extending into said lead storage compartment, a hinged cover for said lead storage compartment, means mounting electrical components of said control and test circuits on said cover, and conductors connecting said control and test circuits to said charging circuit, one of the walls of said casing being provided with an opening communicating with said lead storage compartment and through which said leads may extend to the battery to be charged when said cover is in closed position.

6. In a fast charger of the type comprising a charging circuit including a transformer, an insulated lead for supplying alternating current to said transformer, a rectifier supplied by said transformer, and a pair of insulated charging leads connected to said rectifier for supplying direct current to the battery to be charged, said charger also including subsidiary control and test circuits connected to said charging circuit, the combination of a casing having front, side and rear walls, a partition dividing said casing into a lower compartment and an upper compartment, a hollow cover for said upper compartment hinged to said casing adjacent said rear wall, the upper edge of said front wall being downwardly notched to provide a slot communicating with said upper compartment when said cover is in closed position; means mounting the transformer and rectifier of said charging circuit in the lower compartment of said casing with said insulated leads extending into said upper compartment from whence they may extend outwardly through said slot; means mounting electrical components of said control and testing circuits within said hollow cover, and conduit means extending through said upper compartment and communicating with the interiors of said hollow cover and said lower compartment in all positions of said cover, the conductors connecting said components of said control and testing circuits to said charging circuit extending through said conduit means.

7. In a fast charger of the type including a charging circuit having a transformer, an insulated lead for supplying alternating current to said transformer, a rectifier connected to the output of said transformer, and a pair of insulated charging leads for supplying direct current from said rectifier to the battery to be charged, said charger also including control and test circuits connected to said charging circuit and having manually operable switches and a visible meter respectively, the combination of a casing having front, side and rear walls, a partition dividing said casing into a lower compartment and an upper lead storage compartment, means mounting the transformer and rectifier of said charging circuit in said lower compartment with said leads extending into said lead storage compartment, a hollow cover for said lead storage compartment hinged at one edge to said casing and movable from a position closing said lead storage compartment to a raised position in which the lower surface of said cover is substantially fully exposed, means mounting electrical components of said control and test circuits within said hollow cover with the manual operating members of said switches and the indicating face of said meter exposed on the lower surface of said cover, and conduit means extending through said lead storage compartment and communicating with the interiors of said hollow cover and said lower compartment, the conductors connecting said control and test circuits to said charging circuit extending through said conduit means.

8. A fast charger constructed in accordance with claim 7, wherein the front wall of said casing is provided with an opening capable of passing said leads when said cover is in closed position.

9. In a battery charger of the type including a charging circuit comprising a transformer, an insulated cable for supplying alternating current to said transformer, a rectifier supplied by said transformer, and a pair of insulated charging cables for supplying direct current from said rectifier to the battery to be charged, said charger also including a control circuit having a manually operated switch and a testing circuit including a visible meter, the combination of a casing having upright side walls; a partition dividing said casing into an upper cable storage compartment and a lower compartment; means mounting the transformer and rectifier of said charging circuit in said lower compartment with said cables extending into said upper compartment; a hollow cover for said upper compartment hinged to said casing at one edge and including an edge portion opposite the hinge which abuts the upper edge of the contiguous side wall of the casing when the cover is in lowered position, said upper edge having a notch defining, with said cover, an opening through which said cables may extend from said upper compartment for operation of the charger when the cover is closed, and means mounting electrical components of said control and test circuits, including said switch and meter, within said hollow cover with the manual operating element of said switch and the face of said meter disposed on the lower surface of said cover so as to be exposed when said cover is moved to raised position.

10. In a battery charger of the type including a charging circuit comprising a transformer, an insulated cable for supplying alternating current to said transformer, a rectifier supplied by said transformer, and a pair of insulated charging cables for supplying direct current from said rectifier to the battery to be charged, said charger also comprising a control circuit including a manually operated switch and a testing circuit including a visible meter, the combination of a casing having upright front, side and back walls; a partition dividing said casing into an upper cable storage compartment and a lower compartment; means mounting the transformer and rectifier of said charging circuit in said lower compartment with said cables extending into said upper compartment; a hollow cover for said upper compartment hinged to said casing adjacent said rear wall and including a front edge portion contiguous to said front wall of said casing when the cover is in closed position, and the upper edge of said front wall being cut away over a portion of its length, whereby the upper edge of said front wall and the front edge portion of said cover define an opening communicating with said upper compartment when said cover is in closed position, through which opening said cables may extend for operation for said charger with the cover closed; means mounting electrical components of said control and test circuits, including said switch and meter, within said hollow cover with the manual operating element of said switch and the face of said meter disposed on the lower surface of said cover so as to be exposed when said cover is moved to raised position, and conduit means extending through said cable storage compartment and communicating with the interiors of said hollow cover and said lower compartment, the conductors connecting said components of said control and test circuits to said charging circuit extending through said conduit means.

11. In a battery charger of the type including a charging circuit comprising a transformer, an insulated cable for supplying alternating current to said transformer, a rectifier supplied by said transformer, and a pair of insulated charging cables for supplying direct current from said rectifier to the battery to be charged, the combination of a casing having upright walls, a partition dividing said casing into a lower compartment and an upper cable storage compartment, means mounting the transformer and rectifier of said charging circuit in said lower compartment with said cables extending into said cable storage compartment, a hinged cover for said cable storage compartment, an edge of said cover when in closed position abutting the upper edge of one of said walls, the contiguity of the meeting edges of said cover and said one wall being interrupted, when said cover is in closed position, by an opening through which said insulated cables may extend from said cable storage compartment during a charging operation.

12. In a battery charger of the type including a charging circuit comprising a transformer, an insulated cable for supplying alternating current to said transformer, a rectifier supplied by said transformer, and insulated charging cables for supplying direct current from said rectifier to a battery to be charged, said charger also including a control circuit including a manually operated switch and a testing circuit including a visible meter, the combination of a casing having upright walls, means dividing said casing into a lower compartment and an upper cable storage compartment, means mounting the transformer and rectifier of said charging circuit in said lower compartment with said cables extending into said cable storage compartment, a hinged hollow cover for said cable storage compartment movable from a closed position to a raised position in which the lower surfaces of said cover is exposed, said cover being provided with a flange which abuts the upper edge of one of said walls when the cover is closed, the contiguity of the meeting edges of said flange and said one wall being interrupted, when said cover is closed, by an opening through which said insulated cables may extend from said cable storage compartment during a charging operation, electrical components of said control and testing circuits, including said switch and meter, being mounted within said hollow cover with the manual operating element of said switch and the face of said meter disposed on the lower surface of said cover so as to be exposed when said cover is in raised position.

13. In a battery charger of the type including a charging circuit comprising a transformer, an insulated cable for supplying alternating current to said transformer, a rectifier supplied by said transformer, and insulated charging cables for supplying direct current from said rectifier to a battery to be charged, said charger also including a control circuit including a manually operated switch and a testing circuit including a visible meter, the combination of a casing, a partition dividing said casing into a lower compartment and an upper cable storage compartment, means mounting the transformer and rectifier of said charging circuit in said lower compartment with said cables extending into said cable storage compartment, a hollow cover for said cable storage compartment hinged to said casing and movable from a position closing said cable storage compartment to a raised position in which the lower surface of said cover is substantially fully exposed, and means mounting electrical components of said control and testing circuits within said hollow cover with the manual operating member of said switch and the indicating face of said meter exposed on the lower surface of said cover.

CLYDE SHULER.
CHARLES J. GODFREY.
LEWIS A. MEDLAR.

(References on following page)

REFERENCES CITED

The following references are of record in the file of this patent:

UNITED STATES PATENTS

| Number | Name | Date |
|---|---|---|
| 1,211,752 | Pieper et al. | Jan. 9, 1917 |
| 1,539,051 | McLean | May 26, 1925 |
| 2,101,571 | Breisch | Dec. 7, 1937 |
| 2,130,250 | Reed | Sept. 13, 1938 |
| 2,158,979 | Breisch | May 16, 1939 |
| 2,253,700 | Graham | Aug. 26, 1941 |
| 2,347,452 | Amsden | Apr. 25, 1944 |
| 2,421,828 | Bruney | June 10, 1947 |
| 2,456,978 | Medlar | Dec. 21, 1948 |
| 2,499,663 | Medlar | Mar. 7, 1950 |
| 2,510,624 | Forshey et al. | June 6, 1950 |

FOREIGN PATENTS

| Number | Country | Date |
|---|---|---|
| 169,151 | Great Britain | Mar. 23, 1922 |
| 212,702 | Great Britain | Mar. 20, 1924 |